United States Patent [19]

Luna

[11] Patent Number: 4,556,405
[45] Date of Patent: Dec. 3, 1985

[54] METHOD AND APPARATUS FOR THE BLOWING AND INTERNAL COOLING OF HOLLOW ARTICLES OF GLASS OR OTHER MATERIALS

[75] Inventor: Alberto A. H. Luna, Guadalupe, Mexico

[73] Assignee: Vitro TEC Fideicomiso, Monterrey, Mexico

[21] Appl. No.: 657,230

[22] Filed: Oct. 3, 1984

[30] Foreign Application Priority Data

Oct. 20, 1983 [MX] Mexico .................................. 199155

[51] Int. Cl.[4] .............................................. C03B 9/36
[52] U.S. Cl. ........................................... 65/82; 65/69; 65/83; 65/84; 65/261; 65/267
[58] Field of Search ................. 65/84, 81, 85, 69, 262, 65/267, 261

[56] References Cited

U.S. PATENT DOCUMENTS

| | | | |
|---|---|---|---|
| 2,123,145 | 7/1938 | Peiler | 65/262 |
| 3,397,047 | 8/1968 | Rowe | 65/81 X |
| 3,907,533 | 9/1975 | Jenkins | 65/81 X |
| 4,013,437 | 3/1977 | Northup | 65/81 X |

*Primary Examiner*—Arthur Kellogg
*Attorney, Agent, or Firm*—Abelman Frayne Rezac & Schwab

[57] ABSTRACT

Hollow articles of glass or other materials are blown and cooled within a mold by means of an axially directed gyratory flow of pressurized air introduced tangentially into the blowing head of the mold, and which, after progressing throughout the extent of the mold is exhausted in an opposite axial direction co-axially within said gyratory flow.

7 Claims, 3 Drawing Figures

METHOD AND APPARATUS FOR THE BLOWING AND INTERNAL COOLING OF HOLLOW ARTICLES OF GLASS OR OTHER MATERIALS

FIELD OF THE INVENTION

This invention relates to a method of an apparatus for use in the blow molding of hollow articles from glass or other materials, a typical application of the present invention being in the blow molding of glass chimneys for oil lamps.

BACKGROUND OF THE INVENTION

The blow molding of hollow articles of glass is well known in the art, and is usually carried out by the blow and blow, or, the press blow processes, either in hot molds or pasted molds, which also are well known in the art.

Such forming processes involve three stages:
1. Working of the preform (by blowing or pressing).
2. Thermal homogenization (by superheating or reheating).
3. Blowing and cooling (setting or cooling out).

Product quality and production speed depend mainly on the blowing and cooling stage, this stage being the one that takes the most time to complete.

Two operations are carried out during the blowing and cooling stage: the first is to shape the article by inflating it in the finishing mold, and the second is to remove heat from the molded article and cause setting thereof within the mold.

Of the operations mentioned above, the removal of heat from the molded articles is the more time consuming, and in turn determines the total time required in the blowing and cooling stage.

When heat is removed from the molded glass articles, the following heat transfer phenomena take place:
(a) Heat transfer from the glass to the blow air.
(b) Heat transfer from the glass to the finishing mold.
(c) Heat transfer from the glass to atmosphere.
(d) Heat transfer from the glass to the damp paste.

From analysis of the aforesaid phenomena, it is apparent that the major problem to be resolved is the acceleration of heat transfer to the four elements heretofore recited.

A previous attempt to accelerate heat transfer from molded articles of glass to blow air is described in the U.S. Pat. No. 2,123,145. This patent teaches the introduction of a conduit into the interior of the molded article, in order to introduce blow air at the bottom thereof. This is done hermetically, at first, so as to blow form the article, and is then continued allowing air to escape from the molded article to cool the article.

In this system, the introduction of the tube into the article further increases the time required in the operation. Also, the volume of blow air is insufficient to remove heat from the mold at a rate permitting a considerable reduction of the time required in the forming cycle. Moreover, the mechanical components thereof are complicated, and require precise adjustment for their effective functioning.

Another attempt for achieving the aforesaid purpose is described in U.S. Pat. No. 4,339,258, which relates to the of blowing hollow glass articles in pasted-mold-machines. This patent teaches the positioning of a blowing nozzle in alignment with, but in a non-sealed relation to a neck ring. A space is left between the blow head and the upper neck ring, thus permitting the blow air to get into the article and continuously exit from the interior of the ware through said space. The article is thus molded in a manner which permits a reduction in the time required for forming and cooling the ware.

Several laboratory tests were carried out in order to determine the parameters of the method cited above. It was found that, notwithstanding the great improvement in the rate of forming and cooling of glass articles over the past methods and apparatus, the desired optimum cooling was not attained. Air entering directly into the molded article, formed a pressurized air chamber within its interior, which in turn hampered air from flowing to the bottom of the article, thus diminishing the rate of heat removal from the molded article.

SUMMARY OF THE INVENTION

The object of this invention is to increase the speed of producing molded articles from gobs of molten glass, by accelerating the heat transfer from the molten glass to the blowing air.

According to the present invention a method and an apparatus for blowing and internally cooling hollow articles of glass or other materials, involves the introduction of a tangential flow of blow air into the mold, and the generation of two co-axial gyratory flows of blow air within the mold, comprising an external gyratory flow in a downward direction and an internal gyratory flow in an upward direction. This allows for the proper forming and cooling of the article in shortened cycle time periods, as well as for improvement in the product quality, and an increase in the production speed.

The tangential entry of blow air and the gyratory flow of air relating to the axis of the article causes the blow air to be directed towards the bottom of the mold and produce centrifugal force acting on the internal surface of the article. When the blow air reaches the bottom of the mold, it looses centrifugal power due to friction, in turn forcing it to occupy the central section of the mold while still preserving its gyratory movement. The blow air then progresses upwards through the center of the mold and is exhausted to atmosphere through the blowing head.

The following advantages are provided by the present invention over the previous methods and devices:
1. Greater capacity in the removal of heat.
2. Increased speed in the removal of heat.
3. A more uniform and effective action in the removal of heat.
4. Greater simplicity in the design of the blowing head.
5. Ease of installation and control.
6. Reduction in the number of components of the mold, as compared with present systems.
7. The elimination of relative movement between members of the mold.
8. Longer useful life of the mechanical parts.
9. A reduction in, or elimination of maintenance.

DESCRIPTION OF THE PREFERRED EMBODIMENT

The invention is now described with reference to the accompanying drawings which illustrate a preferred embodiment of the invention, and which are not to be construed as limiting the invention in any manner.

DETAILED DESCRIPTION OF DRAWINGS

Figure 1:
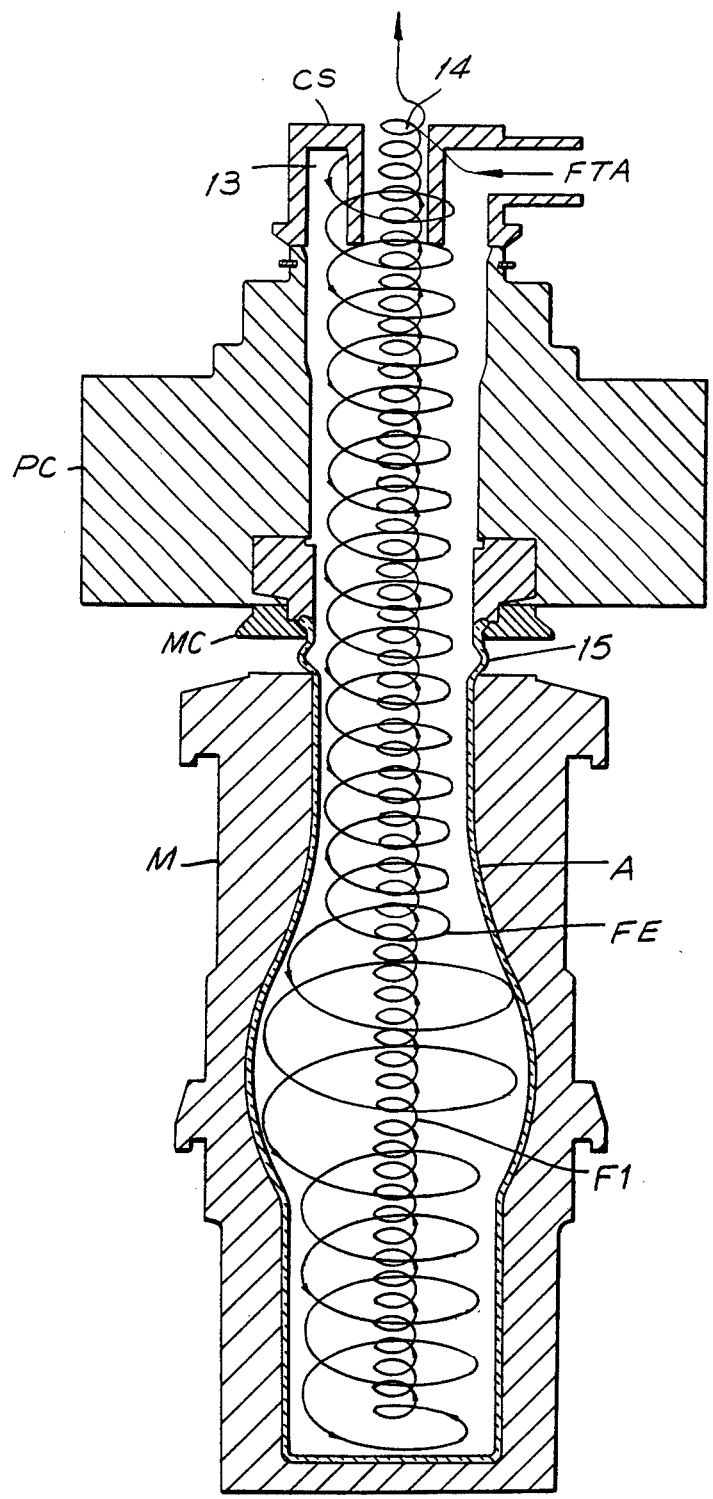
FIG. 1 is a longitudinal sectional view of a mold and blowing apparatus according to the present invention.

Referring to FIG. 1, there is illustrated the method for blowing and internally cooling hollow articles of glass or other materials. A tangential flow of blow air FTA is introduced into the blow head CS, and is caused to generate two co-axial gyratory flows of blow air FE and FI. The centrifugal power of the external flow FE keeps it close to the internal surface of article A and exerts a centrifugal force on the interior of the article A, the flow progressing in a gyratory motion and in a downward direction. When reaching the bottom of the mold, the flow FE looses its centrifugal power due to friction, and, is forced to occupy the central section of the article while still preserving its gyratory movement, thereby generating the internal flow FI, which flows upwardly through the center of the external flow FE, and is exhausted to atmosphere through a central opening of the blow head CS.

The static pressure of both gyratory flows FE and FI will exert adequate internal pressure on article A to adapt it to the internal walls of the mold M and mold the article A into its final form. The gyratory flows of blow air in progressing through the mold provide an enormous transfer of heat from the molded article by way of forced convection, which is produced by the high tangential speed of the gyratory flows and the continuous flow of air through the article.

Figure 3:
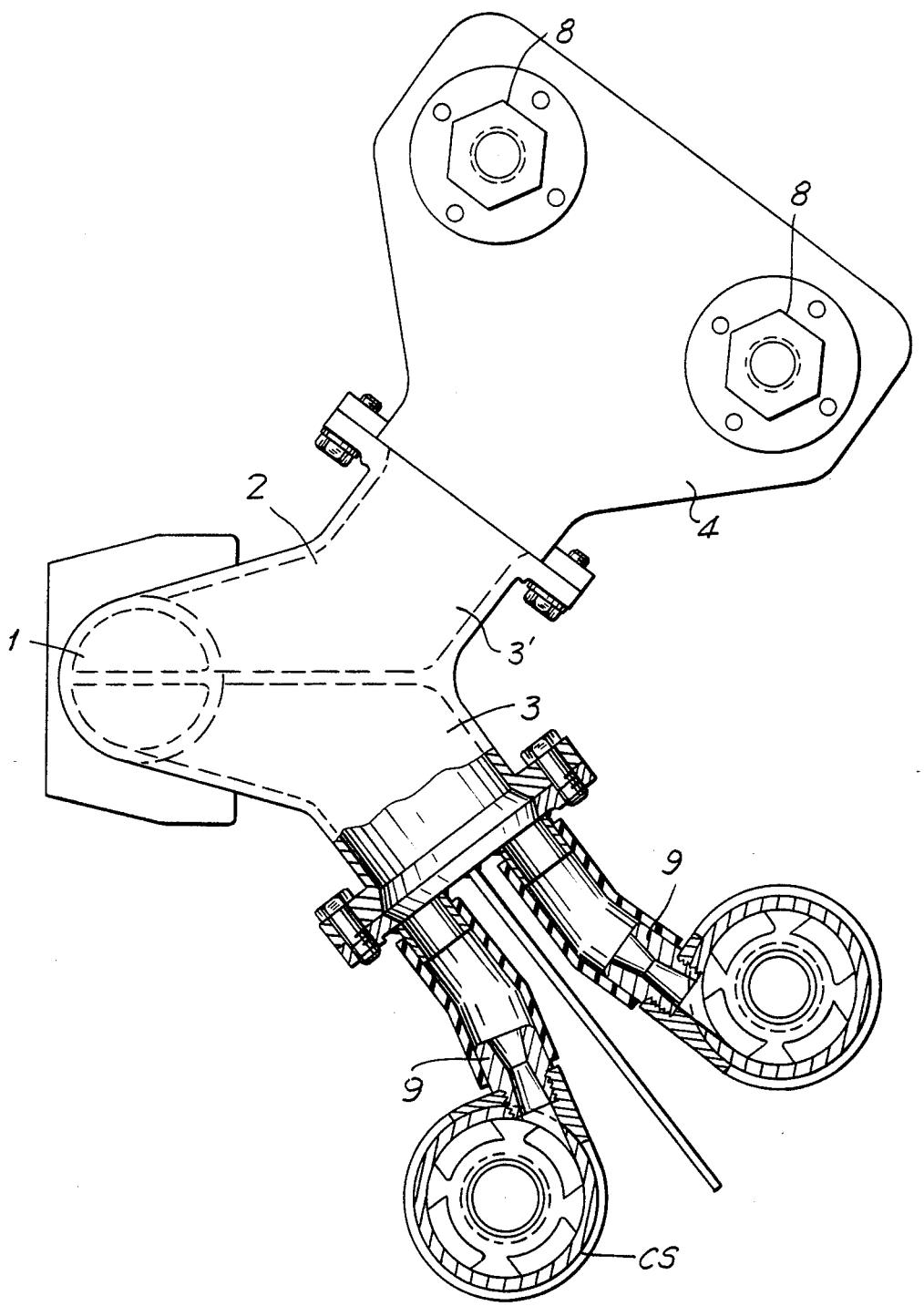

As show in FIG. 3, the apparatus of this invention is supported by a positioning unit 2 mounted to an axis 1 which forks out into two arms 3 and 3'. Each arm includes a holder 4, to which two blowing heads CS are fastened, in order to be adapted to a forming machine such as the one disclosed in U.S. Pat. No. 4,200,449.

Figure 2:
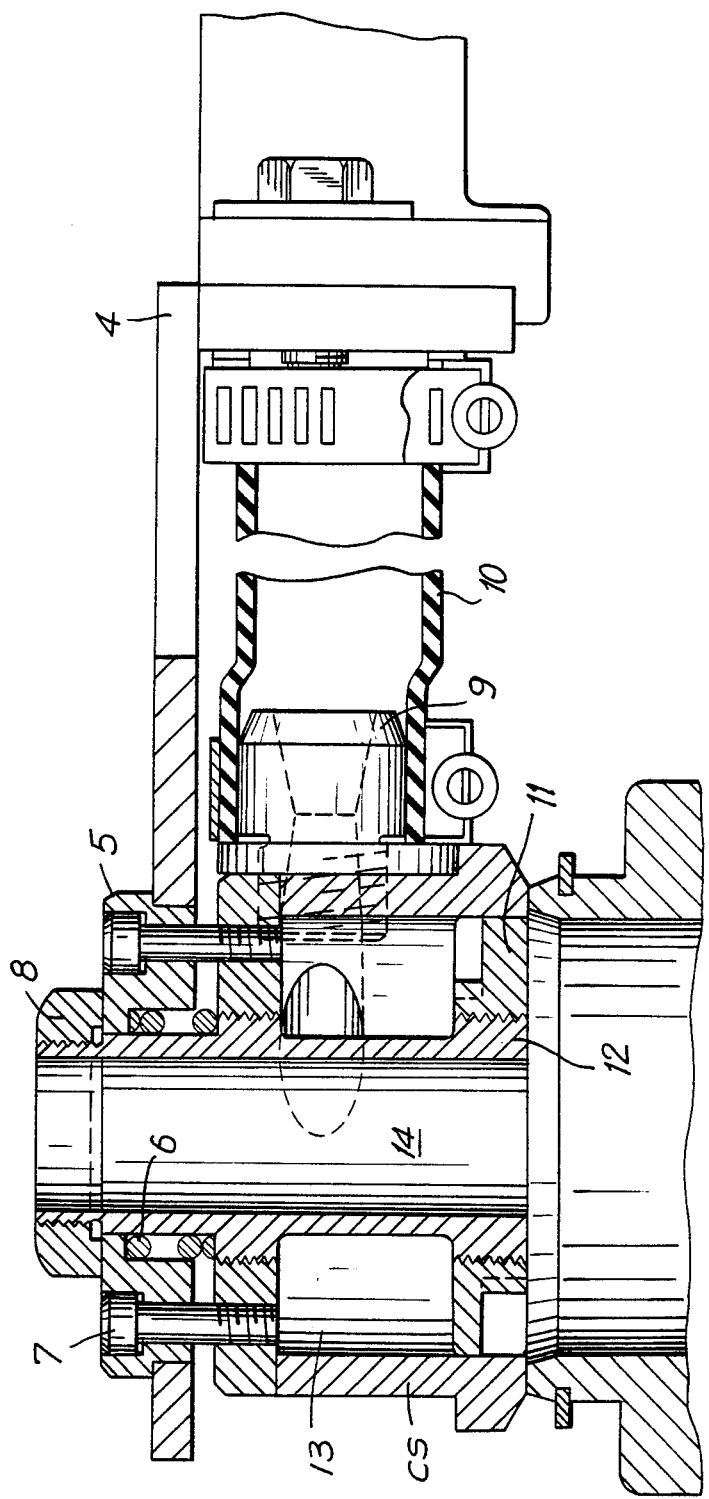
FIG. 2 is a longitudinal sectional view, in greater detail, of a blowing head illustrated in FIG. 1; and, FIG. 3 is a cross sectional view of the apparatus of FIG. 2, mounted on a unit to be adapted to a forming machine reduction.

As shown in FIG. 2, holder 4 includes a support 5 incorporating a coil spring 6 in its interior, and a plurality of peripheral screws 7 which secure the blowing head CS. An adjusting nut 8 secures and axially positions a core 12 of the blowing head CS relative to the support 5.

The blowing head CS comprises a blow air feeding nozzle 9 to which a supply hose 10 is connected for the nozzle to be supplied with a air under pressure. Preferably, the nozzle 9 is placed tangentially with respect of blowing head CS.

A convertor flow 11 is positioned within the blowing head CS, and is threadedly engaged on the core 12. The flow converter 11 and the interior blowing head CS form an annular and spiral entrance plenum 13. A tubular exhaust passage 14 is provided within the core 12 and extends through the adjusting nut 8.

In this manner, the linear flow of blow air entering through the nozzle 9, is converted by the flow convertor 11 within the blowing head CS into a gyratory axial flow for discharge into the article A, as the external flow FE, and which is formed in the sprial plenum 13. This gyratory axial flow of air proceeds downwardly within the article A until it reaches the bottom of the article, at which location it is forced inwardly for it to occupy the central section of article A. The gyratory flow of air then moves in upward axial direction within the external flow FE, and is exhausted to atmosphere through the tubular exhaust passage 14. In this manner, the forming and cooling of the article A is accomplished in a shorter cycle time, and provides an improvement of product quality, as well as an increase in production speed.

During the forming cycle of the machine, parisons are formed by means of the blow and blow, or the press blow process. Said parisons are retained in respective neck ring molds MC, which are moved by a neck ring arm PC to position them over the blowing molds M, which then immediately enter the holders 4. In this manner, the article A, the neck ring mold MC and neck ring arm PC, and the blowing heads CS are correctly oriented to properly form the article, which then proceeds by means of both gyratory flows of air FE and FI. When the article is adequately cooled by the action of the continuous gyratory flows, it is withdrawn in a conventional extracting station.

Both the method and the apparatus of this invention can be applied in other stages of the forming, such as in the working of the preform (when dealing mainly with the double blow process), or in other finishing stages such as in the heat treatment or "tempering" of the molded article.

In the description, reference is made to "cooling blow air". As is obvious, any other type of gas, vapor or other fluid can be used in substitution for air.

The method and the apparatus of this invention described above, are included herein by way of illustration. Experts in the field, in view of the knowledge acquired through this invention, will be capable of performing variations as to the design and layout. All such modifications are to be construed as falling within true scope and intent of the invention hereby claimed as follows:

I claim:

1. A method of blowing and internally cooling hollow articles of thermoformable materials, comprising the steps of:
   providing a continuous flow of blowing and cooling air under pressure;
   converting said air flow into a gyratory axial flow of said air;
   introducing said gyratory flow of air into one end of a blowing mold as the source of blowing air therefore;
   permitting said gyratory flow of air to proceed through said mold in a first axial direction to an opposite end of said mold as a substantially laminate flow of said gyratory axial flow of said air;
   reversing the axial direction of said flow of said gyratory flow of air at an opposite end of said mold; and,
   exhausting said axially reversed gyratory flow of air from said mold from said one end of said mold in an axial direction opposite said first axial direction, and, as a gyratory flow of air co-axial with and confined within said gyratory flow of air in said first axial direction.

2. The method of claim 1, further including converting a linear flow of said air into said gyratory flow by injecting said linear flow tangentially into a clindrical chamber, and permitting the gyratory flow thus produced to exit from one axial end of said cylindrical chamber.

3. The method of claim 1, wherein the kinetic energy of said gyratory flow of air is employed to assist in the blowing of said article, and, said gyratory flow of air is employed to scavenge heat from within said article.

4. A blowing head for a machine used in the blow molding of hollow articles of thermoformable materials, said blowing head comprising;
 a body providing an annular chamber defined by inner and outer walls and an annular end wall closing one axial end of said chamber, said inner wall defining an outlet passage extending through said body and co-axial with said annular chamber; and,
 air inlet means positioned proximate said closed end of said annular chamber, and operative to inject a high-pressure flow of air tangentially into said chamber;
 whereby said air injected into said chamber is converted into a gyratory cyclonic flow of air issuing from said open end of said chamber for use in said blow molding of said hollow articles, said gyratory flow exhausting from said hollow articles through said outlet passage and concentrically within said gyratory flow within said articles.

5. The blowing head of claim 4, further including air flow directing means positioned within said annular chamber and operative to assist in the formation of said gyratory air flow.

6. In a machine used in the blow molding of hollow articles of thermoformable materials, and which includes a blowing mold, and a blowing head for operative association with said blowing mold, the improvement comprising:
 said blowing head including a body providing an annular chamber defined by inner and outer walls and an annular end wall closing one axial end of said chamber, said inner wall defining an outlet passage extending through said body and co-axial with said annular chamber; and,
 air inlet means positioned proximate said closed end of said annular chamber, and operative to inject a high-pressure flow of air tangentially into said chamber;
 whereby air injected into said chamber is converted into a gyratory cyclonic flow of air issuing from said open end of said chamber into the interior of a said hollow article contained within a said blowing mold, said gyratory flow of air, after traversing the interior of said hollow article in one axial direction, being reversed in axial direction and exhausted from said blowing mold co-axially within said gyratory flow of air in said one axial direction and out through said outlet passage of said body of said blowing head.

7. The machine of claim 6, further including air flow directing means positioned within said annular chamber of said blowing head, and operative to assist in the formation of said gyratory air flow.

* * * * *

UNITED STATES PATENT AND TRADEMARK OFFICE
CERTIFICATE OF CORRECTION

PATENT NO.   : 4,556,405
DATED        : October 3, 1984
INVENTOR(S)  : LUNA

It is certified that error appears in the above-identified patent and that said Letters Patent is hereby corrected as shown below:

Front page, above the title

Amend inventor's last name to read

--HERNANDEZ LUNA--

Front page, under [75], amend inventor's name to read

--Alberto A. HERNANDEZ LUNA--

Signed and Sealed this

Sixteenth Day of September 1986

[SEAL]

Attest:

DONALD J. QUIGG

Attesting Officer      Commissioner of Patents and Trademarks